United States Patent [19]

Markiewicz

[11] Patent Number: 4,927,689
[45] Date of Patent: May 22, 1990

[54] GAS BARRIER STRUCTURES

[75] Inventor: Stan J. Markiewicz, Whitby, Canada

[73] Assignee: Du pont Canada Inc., Mississauga, Canada

[21] Appl. No.: 70,829

[22] Filed: Jul. 7, 1987

[30] Foreign Application Priority Data

Jul. 17, 1986 [GB] United Kingdom ............... 8617535

[51] Int. Cl.$^5$ ................................................ A22C 13/00
[52] U.S. Cl. .................................... 428/34.8; 428/35.4; 428/36.7; 428/349; 428/353; 428/423.5; 428/423.7; 428/518
[58] Field of Search ................ 428/36.7, 353, 35.4, 428/34.8, 518, 349, 423.5, 423.7

[56] References Cited

U.S. PATENT DOCUMENTS 4,565,742 1/1986 Lang .................................... 428/518

FOREIGN PATENT DOCUMENTS 3035778 4/1978 Japan .
0019525 1/1985 Japan .
2115770 9/1983 United Kingdom .

*Primary Examiner*—Edith Buffalow

[57] ABSTRACT

A gas barrier structure is disclosed which comprises a base synthetic thermoplastic polymeric layer, e.g. nylon, polyethylene, having two coatings on one side of the base layer. The first coating is a solvent-based urethane primer and the second coating comprises a polyvinyl alcohol gas barrier material. The primer is present in the range of 0.3 to 3.0 g/m$^2$ and the polyvinyl alcohol is present in an amount of up to 2.0 g/m$^2$. The polyvinyl alcohol is deposited from solution or dispersion.

11 Claims, No Drawings

GAS BARRIER STRUCTURES

The present invention relates to so-called high gas barrier structures, especially films. Such structures are sought after in order to provide long shelf life for foodstuffs which tend to spoil through oxidation.

It is known to use aluminum foil, vacuum-deposited aluminium, polyvinyl alcohol, saponified copolymers of ethylene and vinyl acetate and polyvinylidene chloride as gas barriers for food packaging, usually as a part of a composite structure. European Publication No. 132 565 to De Antonis et al., published Feb. 13, 1985, discloses a film laminate comprising a polyamide layer and an ethylene/vinyl alcohol copolymer layer. The laminate may include other compatible polymeric film layers and adhesives. The laminate is expanded to an area of less than four times the original, and is preferably drawn to a draw ratio of 1.5:1 to 4:1 in one direction. The ethylene/vinyl alcohol copolymer is preferably hydrolysed with a degree of hydrolysis of 85 to 99.5% and contains 15 to 65 mole per cent of ethylene. The laminate is disclosed as having good oxygen barrier properties, which are greater than would be expected from separate films of oriented polyamide and ethylene/vinyl alcohol copolymer layers.

Japanese Patent No. 59 182 714 to Kido Shigyo KK, published Oct. 17, 1984, discloses a process comprising extruding an ethylene/vinyl alcohol film and laminating other films onto both surfaces of the extruded film. Films having water-vapor resistance, e.g., polyethylene, polypropylene, polyvinyl chloride, polyvinylidene chloride, polyester and nylon, are preferably coated with an adhesive and applied onto the extruded film. The laminated film is reported to have good gas barrier properties, which decrease as the ethylene/vinyl alcohol copolymer absorbs moisture.

West German Patent No. 3 207 740 to Dahms et al., published Sept. 15, 1983, discloses a multi-layer synthetic film, consisting of a middle gas diffusion barrier layer, covered on both sides with polymer layers. Such multi-layer film is used as a jacket layer for synthetic water pipes. The laminated jacket films are of polyethylene/polyamide/polyethylene, polyethylene/polyvinylidene chloride/polyethylene, polyethylene/polyvinyl alcohol/polyethylene. The inner barrier layer may also be a laminate, e.g., polyamide/polyvinyl alcohol, polyvinylidene chloride/polyamide/polyvinylidene chloride or polyvinylidene chloride/polyester/polyvinylidene chloride. The thickness of the barrier layer is 3–150 microns ($\mu$m) and the thickness of the two outer layers is at least that of the barrier layer. Diffusion of oxygen into the pipe, when such a multi-layer film is used as a jacket for the pipe, is reported as being negligible.

Japanese Patent No. 57 061 025 to Kuraray KK, published Apr. 13, 1982 discloses a transparent film, without fish-eyes and having excellent gas-barrier and anti-dewing properties. The film comprises a thermoplastic film, e.g., polypropylene, polystyrene, polyester, nylon, regenerated cellulose, polyethylene, polyvinyl chloride, coated with a solution of ethylene/vinyl alcohol copolymer resin of saponification value of at least 96%, and ethylene content of 25–60 wt percent containing 0.1 to 3 wt percent of a nonionic surfactant having a hydrophilic-lipophilic balance of 4 to 16. The solvent for the ethylene/vinyl alcohol copolymer may be mixtures of water and n-propanol, iso-propanol, t-butyl alcohol, methanol, ethanol, dioxane and the like. After coating the surface of the film, drying same and removing the solvent, the coated film is preferably heated at 80°–170° C. to improve the anti-dewing, gas barrier property, mechanical strength and slip. The film is useful as a packaging material, especially for foods.

Japanese Patent No. 57 059 720 to Unitika KK, published Apr. 10, 1982 discloses production and biaxial oriention at a draw ratio of more than 500% of a composite film comprising an amorphous polyamide film and a completely saponified polyvinyl alcohol film. The film produced is useful for packaging materials and in industrial applications, e.g., mould release films. Such film is reported as having excellent clouding proof properties, mould release properties, oxygen barrier and perfume retention properties. In an example, a polyvinyl alcohol film having a thickness of 110 microns and a moisture content of 7.5%, a polymerization degree of 1680 and a saponification degree of 99.4 mol percent was laminated with a polyamide film having a thickness of 70 microns ($\mu$m) using a urethane-based adhesive. The resulting laminate film (nylon 6) was simultaneously biaxially oriented at a draw ratio of 3 in the machine and transverse directions at 135° C. and then heat treated at 195° C. for 5 sec. kg/$\mu$m$^2$ and had excellent folding endurance and abrasion resistance.

Japanese Patent No. 55135659 to Toray Industries Inc. published Oct. 22, 1980 discloses a laminate film comprising many layers of saponified ethylene/vinyl acetate copolymer (EVOH) and many layers of polyamide. The two kinds of polymer layers are alternately laid on top of each other. The number of pairs of layers is from 7 to 150. Typically, ten 1 micron thick sheets of EVOH and ten 1 micron ($\mu$m) thick sheets of polyamide is superior in gas permeability, impact strength and dimensional stability to a double layered film made of a 10 micron ($\mu$m) thick sheet of EVOH and a 10 micron ($\mu$m) thick sheet of polyamide.

Japanese Patent No. 54 104 988 to Toppan Printing KK, published Aug. 17, 1984 discloses a container consisting of (a) an inner layer made from an ethylene/vinyl alcohol copolymer which contains 20–50 mol. percent of ethylene and has a saponification degree of greater than 95 mol. percent, (b) an intermediate layer made from a grafted and modified polyolefin and an unsaturated carboxylic acid, or derivative thereof, or an unsaturated glycidyl compound, and (c) an outer layer of a polyamide. The container may be an extruded tube.

Japanese Patent No. 54 047 776 to Gunze KK, published Apr. 16, 1979 discloses a film comprising outer hydrophobic resin layers of a polyamide resin and an ethylene/vinyl acetate saponified copolymer, in which the ethylene content is 25–50 mole percent and the degree of saponification is at least 90 percent. When laminating a composite film of a hydrophobic resin layer and an ethylene/vinyl acetate saponified copolymer layer to a composite film of a hydrophobic resin layer and a polyamide resin layer, with the polyamide resin layer adjacent the copolymer layer, the copolymer layer is laminated at 230°–270° C. and immediately pressed under linear pressure of at least 5 kg/cm$^2$. When the bonding between the polyamide and the hydrophobic resin layers or the hydrophobic resin and the copolymer layers is not adequate, an adhesive layer, e.g., a modified polyolefin, may be used. The films are reported to have good gas impermeability, transparency strength and hot water resistance, which do not cause curling thus making them especially useful for automatic packaging.

Japanese Patent No. 53 035 778 to Nippon Synthetic Chemical Industries, published Apr. 13, 1978 discloses a laminate comprising a heat sealing layer, a biaxially-stretched layer obtained by drawing a film of saponified ethylene/vinyl acetate copolymer, and a biaxially stretched film of polypropylene, polyester or nylon. The saponified ethylene/vinyl acetate copolymer has 15–45 mole percent ethylene content and a degree of saponification of greater than 95 mole percent and the film made therefrom has been drawn at least 1.5 times in the machine and transverse directions and has a fusing temperature of greater than 95° C. in water.

Japanese Patent No. 60 052 337 to Toyobo KK, published Mar. 25, 1985 discloses a film comprising (a) a polyester film having a film density of up to 1.355 g/cm$^3$ and a maximum refractive index of up to 1.590 to the direction parallel to the surface, (b) a soft polymer material laminated to at least one surface of the polyester film, and (c) a sparingly gas permeable material laminated to the soft polymer and having an oxygen permeability of 30 ml/m$^2$.24 hr. atm. at 20° C. under the dried condition of the laminated film and peel strength of at least 1000 g/15 mm at 20° C. when the laminated film is heat sealed. The soft polymer is preferably polyethylene, polyurethane or polyester elastomer. The sparingly gas permeable material is preferably polyvinyl alcohol, saponified ethylene/vinyl acetate copolymer polyamide, aluminium foil, or metallized polyester or polyamide.

Japanese Patent No. 60 019 525 to Toppan Printing KK, published Jan. 31, 1985 discloses a film obtained by bonding hydrophilic films to an arbitrary material using a moisture-curing type adhesive to laminate the material with the films. Water content of the hydrophilic films is 1–5%. The adhesive is preferably a urethane-containing adhesive, the hydrophilic film is preferably nylon, polyvinyl alcohol or an ethylene/vinyl acetate copolymer and the arbitrary film is preferably polyolefin, polyester, polystyrene or cellulose film.

U.S. Pat. No. 4,544,698 to Roullet et al. which issued Oct. 1, 1985 discloses coating thermoplastic material, e.g., polyolefins, polyamides, polyesters, with an aqueous solution of a polyvinyl alcohol and a water insensitive polymer latex. The implication of the disclosure appears to be that for polyvinyl alcohol alone the gas permeability increases in proportion to its moisture content, and stains due to moisture. Apparently any kind of polyvinyl alcohol is suitable for use in combination with the water insensitive latex. Preferably the polyvinyl alcohol may be hydrolyzed polyvinylacetates having more than about 90 percent vinyl alcohol moieties, or may be hydrolyzed ethylene/vinyl acetate copolymers containing less than 10 percent ethylene units. Suitable water insensitive polymer latexes include styrene-butadiene or styrene alkyl acrylate latexes, vinyl halogenide latexes such as vinyl chloride and vinylidene chloride. The composition is characterized by forming a two-phase coating upon drying, such that the latex polymer forms the continuous phase and the polyvinyl alcohol forms the discontinuous phase.

Coating thicknesses, of the polyvinyl alcohol and polymer latex layers, of 2.9–4.3 microns ($\mu$m) are exemplified, giving oxygen permeabilities at 45 percent relative humidity and 40° C. of between 0.8 and 2 cm$^2$.s$^{-1}$.cmHg$^{-1}\times 10^{12}$.

U.S. Pat. No. 4,416,938 to Haskell, which issued Nov. 27, 1986 discloses a transparent gas barrier, for retortable pouches made from a dialdehyde-treated polyvinyl alcohol. Haskell indicates that films made from polyvinyl alcohol, chemically hardened or not, have been used in packaging materials but have been found to exhibit moisture sensitivity inconsistent with good barrier properties. This problem is overcome by using a coating composition comprising a homogenous combination of metal orthophosphate and dialdehyde treated polyvinyl alcohol. The metal is primarily iron or aluminium, but may contain small quantities of tin, titanium or zirconium. Elvanol TM 71-30 is disclosed as being a suitable type of dialdehyde treatable polyvinyl alcohol. The coatings are described as being substantially glassy or non-crystalline, and may be placed on shaped substrates such as fibres, films and containers prepared from polyesters, polyamides, polyolefins and other polymers.

U.S. Pat. No. 4,418,119 to Morrow et al., which issued Nov. 29, 1983 discloses an ovenable board made of paperboard, having coatings of polyvinyl alcohol and silicone. The polyvinyl alcohol, e.g., Elvanol brand, is coated at a weight of about 3 to 12 lb/ream and the silicone release coating, e.g., General Electric SS 4191 brand, is coated at a weight of about 0.7 to 0.9 lb/ream. The silicone coating is cured using a catalyst and an accelerator. The polyvinylalcohol may be selected from any commercially available product. Morrow et al. disclose that such an ovenable board can withstand temperatures of from 0° to 350° F. ($-18$° to 177° C.).

U.K. Patent No. 2 115 770, published Aug. 7, 1985 to A. N. Ferrar et al. discloses the manufacture of film composites which include gas barrier materials. In this patent, it is disclosed that multiply structures of ionomer/gas barrier/ionomer, ionomer/gas barrier/polyester or ionomer/gas barrier/nylon layers can be made by adhesive combination of several plies of single layers, adhesive combination of composite plies or by a coextrusion process. Suitable gas barrier layers are indicated as being made from polyvinylidene chloride, polyvinyl alcohol or an ethylene/vinyl acetate copolymer which may be partly hydrolysed. Specifically disclosed are the manufacture of multiply structures by coating an ionomer base layer with a layer of polyvinylidene chloride and then adhesively bonding a further layer, viz of nylon, polyester or ionomer, to the polyvinylidene chloride.

In many of the prior art structures, the gas barrier layer is in film form or part of a coextrusion. The thickness of each gas barrier layers is such that it usually affects the physical properties of the structure, e.g., flex crack resistance, impact resistance. The gas barrier properties could be attained with significantly thinner layers of polyvinyl alcohol or ethylene vinyl alcohol copolymer, but such thin coextrusions or films thereof tend to pinhole, thus making such an approach impractical. Coating a base film with a thin coating of such gas barrier materials would provide the necessary gas barrier properties while essentially maintaining the structural properties of the base film. Heretofore polyvinyl alcohol, applied as a coating from solution or dispersion, has been used as a sizing agent and adhesive for hydrophilic, porous materials, e.g., paper. It has been demonstrated that commercially functional flexible packaging material, even employing hydrophilic films such as nylon, cannot be prepared from direct application of wet polyvinyl alcohol, i.e., from dispersion or solution. In particular, the bond between the gas barrier layer and the base layer seems to disintegrate, especially when the film composite is subjected to moisture.

A structure and a method of making such a structure which overcomes the foregoing difficulty has now been found.

Accordingly, the present invention provides a composite structure comprising a synthetic thermoplastic polymeric base layer having two coatings on one side of said base layer, the first coating being adjacent the base layer and being a solvent-based urethane primer, which when dry allows an aqueous dispersion or solution of polyvinyl alcohol to "wet out" the primer, in an amount in the range of from about 0.3 to about 3.0 g/m$^2$ of the base layer, and the second coating being placed on the exposed dried surface of the first coating and being a polyvinyl alcohol gas barrier material in an amount up to about 2.0 g/m$^2$ of said base layer, said second coating having been formed from a dispersion or solution.

In an embodiment the surface free energy of the dried primer is at least 36 mN/m.

In a preferred embodiment the first coating is a two component urethane primer.

In another embodiment the second coating has a saponification value of at least about 90 mole percent, preferably at least about 99 mole percent.

In yet another embodiment the polyvinyl alcohol gas barrier material is in an amount of from 0.15 to 2.0 g/m$^2$, especially from 0.5 to 1.0 g/m$^2$.

Depending upon the end use for the composite structure, the base layer may be formed from nylon, ethylene/vinyl alcohol copolymer, polyolefin, polyester, or olefin copolymers, e.g., ionomers, ethylene/vinyl acetate copolymers. The base layer may be in film form or in a moulded form. For example, for packaging meats and the like, a preferred base layer is nylon in film form. For food tray lidding material, preferred base layers are polyester or nylon, as film or in a preformed state.

The base layers useful in the present invention particularly include polypropylene, polyester, high density polyethylene, low density polyethylene nylon 6 and nylon 66.

In further embodiments the composite structure has a heat-sealable layer, e.g., polyethylene or ionomer film adhesively laminated to the gas barrier layer or a heat-sealable layer, e.g., polyethylene or ionomer film laminated coated on the gas barrier layer.

The invention also provides a process for forming a composite film comprising:

(a) coating a base synthetic polymeric film with a solvent-based urethane primer, which when dry allows an aqueous dispersion or solution of polyvinyl to "wet out" thereon and drying said primer to form a primer coating in an amount in the range of about 0.5 to about 3.0 g/m$^2$ of the base film;

(b) coating the dried primer with an aqueous dispersion or solution of polyvinyl alcohol and drying said dispersion or solution to form a gas barrier coating in an amount in the range of up to about 2.0 g/m$^2$ of the base film.

In an embodiment the surface free energy of the dried primer is at least 36 mN/m.

In yet another embodiment the polyvinyl alcohol gas barrier material is in an amount of from 0.15 to 2.0 g/m$^2$, especially from 0.5 to 1.0 g/m$^2$.

In a preferred embodiment the gas barrier coating of the composite film is subsequently adhesively laminated to a heat sealable film.

Surprisingly it has also been found that a composite film comprising a unoriented synthetic thermoplastic polymeric base film having a urethane primer coating thereon in an amount of about 0.5 to about 3.0 g/m$^2$ of the base film, and a polyvinyl alcohol or gas barrier coating applied to the primer coating in an amount of up to about 2.0 g/m$^2$ of the base film may be oriented without destroying the gas barrier properties of the composite film. The orientation may be monoaxial biaxial.

The invention also provides a food package comprising food enveloped in a film composite, said film composite comprising a base synthetic thermoplastic polymeric film on the outside of the package, a primer coating, in a amount of about 0.5 to about 3.0 g/m$^2$ of the base film on the inner side of the base film, a gas barrier coating adjacent to the primer coating, in an amount of up to about 2.0 g/m$^2$ of the base film, and a heat-sealable layer adhered to the gas barrier coating by adhesive lamination or extrusion coating, said primer coating being a urethane primer, and the gas barrier layer comprising polyvinyl alcohol, said gas barrier layer having been coated from an aqueous dispersion or solution thereof.

The term "primer" as used herein will be understood by those skilled in the art to mean those coatings which are formulated to promote adhesion between layers of two materials but which will not, in the coating process, adhere or transfer in part or in whole to surfaces contacted by the coating prior to the application of the top coat. Primers useful in the present invention are known. Primers which may be used include polyester or polyether-based polyurethane liquid resins.

Solvent-based urethane primers include those which are soluble in substantially non-polar organic solvents, e.g. methyl ethyl ketone, ethyl acetate and toluene, and exclude those which are soluble in relatively polar solvents, e.g. water, alcohols.

As used herein "polyvinyl alcohol" is the product formed by hydrolysing (saponifying) polyvinyl acetate. It is sometimes referred to in the trade as PVAL. Those polyvinyl alcohols which are highly saponified, e.g., 90-99.99 mole percent, are most useful as gas barrier materials, and are particularly preferred in the present invention.

In the present invention, the PVAL materials are not first formed into film nor are they melt extruded onto the base synthetic thermoplastic polymeric layer. The PVAL is coated onto the base layer from a dispersion or solution.

With respect to the film composite, the following describes a typical process and product of the present invention. Although reference is only made to a nylon base film, it will be understood that it is for exemplification only.

Nylon film is pulled from a roll and transported past two coating stations. Typically, the nylon film is about 20-80 μm in thickness but may be from 8-125 μm, and depending on the end use may be unoriented or oriented. For most food packaging applications, unoriented film is preferred. The linear speed of the nylon film, past the coating stations is typically about 90 m/min-300 m/min, using commercial apparatus.

The urethane primer may be, for example, a reaction product of a polyester or a polyether component and a diisocyanate component. It is often supplied in solution form in an organic solvent, e.g., acetone, ethyl acetate or toluene. The urethane primer may be applied using a gravure cylinder. The primer-coated nylon film is then dried in order to remove the solvent. The urethane primer is applied in a manner such that, when dry, the amount applied is from about 0.5 to about 1.5 g/m² of the nylon film. Typically, the amount is about 0.6 to 0.8 g/m². A suitable urethane primer is available from Morton Chemical Company under the trade mark Adcote 503H. As indicated hereinbefore, it is important that the primer has substantially no "green tack". Otherwise, when the primer-coated film passes through the roller assembly of the laminator, the primer may be picked off, and the PVAL subsequently applied will be in direct contact with the base film and subject to being poorly bonded to the base film. It is important that the primer, when dry, can be "wetted out" by the PVAL solution (or dispersion). The term "wetted out" refers to an even coating of PVAL solution forming on the primer, without any formation of holes or puddles in the coating. It has been found that, for best results the primer, when dry should have a high free surface energy, e.g. above about 36 mN/m. Free surface energy is measured by the procedure ASTM No. D2578.

The PVAL is applied at the second coating station. Isopropyl alcohol or ethanol may be added to the solution, in an amount up to 50 wt. percent, e.g. from 5 to 35 wt percent of the solution, to minimize foaming of the solution and to assist in drying the PVAL coating. Other compounds may be added in minor amounts to improve wettability of the primer, decrease moisture sensitivity of the dried topcoat, as well be understood by those skilled in the art. The PVAL solution may be applied using a gravure or reverse gravure roll. The PVAL is applied in a manner such that when dry, the amount applied is up to about 2.0 g/m² of the nylon film, especially from 0.15 to 2.0 g/m². Typically, the amount is about 0.5 to 1.0 g/m², especially from 0.8 to 0.9 g/m². Suitable PVALs are available from E. I. du Pont de Nemours and Company under the trade marks ELVANOL 71–30 and ELVANOL 90–30. The PVAL-coated structure is then passed through a dryer in order to remove the water. Drying may be provided by known means, e.g., in a so-called roll support oven or in a floater oven.

With respect to the PVAL coating, the small quantity of PVAL laid down on the base sheet and the high bond strength between the primer and the PVAL means that the PVAL coating thickness cannot be measured accurately using classical unit weight measuring techniques. The coating weights are based upon the theoretical lay-down capability of the coating technique and the concentration of the PVAL dispersion or solution.

The PVAL-coated base layers show excellent oxygen barrier properties. For example, a 25 um thick nylon film coated with about 0.7 g/m² urethane primer and 0.9 g/m² Elvanol 71–30 PVAL showed an oxygen permeability of less than $15.5 \times 10^{-6}$ ml $O_2$/cm² film/24 h at 0% relative humidity (R.H.).

The gas barrier-coated film of the present invention is not normally used without being bonded to another film. For example, the PVAL-coated nylon film referred to above may be adhesively laminated or extrusion coated with a heat sealable film or layer. The heat sealable layer is typically a low density polyethylene, linear low density polyethylene, an ethylene/vinyl acetate copolymer or a mixture thereof, or an ionomer. The four-or-five layer structure, e.g., nylon film-primer-PVAL-extrusion coated heat sealable film or nylon film-primer-PVAL-adhesive-heat sealable film, may then be used to package, for example, wieners, bacon, which are sensitive to spoilage by oxygen.

The following examples are used to illustrate the present invention.

EXAMPLE 1

This example does not fall within the scope of the present invention and is included for purposes of comparison.

A 7 wt percent aqueous solution of Elvanol 71–30 polyvinylalcohol, containing 5 wt percent isopropyl alcohol was coated onto a 25 um thick unoriented nylon 66 film, using a Faustel TM coater with a gravure roll. The "line speed" was 12 m/min and the drying oven temperature was set at 150° C. The solution "wetted out" well on the nylon film, and the temperature of the PVAL-coated film at the exit from the oven was 52–60° C. The coated film was extremely clear. The oxygen permeability, as measured by the procedure of ASTM F-372 was about $7.8 \times 10^{-6}$ ml/cm²/24 h at 23° C. and 0% R.H.

The PVAL-coated film so produced was adhesively laminated to a 76 um thick film of low density polyethylene film. The bond strength of this laminate was tested by pulling the nylon and polyethylene films apart with a Suter* tester, according to the procedure of ASTM D-1876. The bond strength was found to be about 20 g/cm, with the PVAL coating being pulled from the nylon film.

EXAMPLE 2

Example 1 was repeated, except that the nylon film was first coated with Adcote TM 503-H two-component urethane primer (with Catalyst F) in an amount of about 0.7 g/m². The bond strength was measured. The bond strength over the entire range of relative humidities (0–100% R.H.) was at least 390 g/cm. Oxygen permeabilites, in ml/cm²/24 h at 23° C., were $15.5 \times 10^{-6}$ at 0% R.H., $34.1 \times 10^{-5}$ at 53% R.H., $52.7 \times 10^{-4}$ at 75% R.H., and $27.9 \times 10^{-3}$ at 100% R.H. This example falls within the scope of the present invention.

EXAMPLE 3

Adcote 503-H urethane primer was coated onto a 25 um nylon 66 film in an amount of about 0.7 g/m² and the primer dried. The surface free energy on the primer coating was 40 mN/m. A 5 wt percent of aqueous solution of Elvanol 71–30 polyvinyl alcohol containing 9 wt percent isopropyl alcohol was coated onto the primer coating in an amount of about 0.8 g/m², and dried. The thus-coated film exhibited an oxygen permeability of less than $15.6 \times 10^{-6}$ ml/cm²/24 h at 23° C. and 0% R.H. The line speed was 90 m/min. This example falls within the scope of the present invention.

EXAMPLE 4

Example 2 was repeated except that the nylon base film was replaced by 12 μm oriented polyester film and the primer coating weight was increased to 2.44 g/m². The bond strength was measured at at least 275 g/cm at 0 and 100% R.H. The oxygen transmission was less than $3.1 \times 10^{-5}$ ml/cm²/24 h at 23° C. and 0% R.H.

EXAMPLE 5

Example 2 was repeated except that the nylon base film was replaced by 51 μm unoriented linear low density polyethylene film. The bond strength was measured at at least 275 g/cm at 0 and 100% R.H. The oxygen transmission was less than $77.5 \times 10^{-6}$ ml/cm$^2$/24 h at 23° C. and 0% R.H.

EXAMPLE 6

A 25 μm unoriented nylon 66 film was coated with a Adcote 503H two component urethane primer in an amount of 2.44 g/m$^2$. The primer was dried. A 5 wt % aqeous solution of Elvanol 90-50 polyvinyl alcohol containing 25 wt % isopropyl alcohol was coated onto the primer coating in an amount of about 0.81 g/m$^2$ at a line speed of 12 m/min. The polyvinyl produced was adhesively laminated to a 51 μm thick film of low density polyethylene film. The bond strength of this laminate was tested by pulling the nylon and polyethylene films apart with an Instron* tester, at 0% R.H. The bond strength was found to be at least 275 g/cm. The oxygen transmissions, in ml/cm$^2$/24 h at 23° C., were $46.5 \times 10^{-6}$ at 0% R.H., $109 \times 10^{-6}$ at 59% R.H., 0.002 434 at 75% R.H., 0.003 472 at 80% R.H. and 0.014 353 at 100% R.H.

EXAMPLE 7

Example 2 was repeated except that the unoriented nylon film was 76 μm thick. The coated film was then oriented in the machine direction. The draw ratio was 3.1 to 1. The thickness of the coated film was then about 25. The oxygen permeability was measured as $31 \times 10^{-6}$ ml/cm$^2$/24 h at 0% R.H. and as 0.0062 ml/cm$^2$/24 h at 100% R.H. The oriented coated film was then adhesively laminated to linear low density polyethylene film. The bond strength was measured at greater than 158 g/cm.

EXAMPLE 8

Example 2 was repeated except that the polyvinyl alcohol was deposited from a 1.25 wt % aqueous solution of Elvanol TM 71-30. The coating weight, when dry, was estimated to be 0.16 g/m$^2$. The oxygen permeability of the coated film was measured as $77.5 \times 10^{-6}$ ml/cm$^2$/24 h.

EXAMPLE 9

About 333 single component urethane primer was coated onto a 25 μm nylon 66 film. The coating weight of the primer was 2.44 g/m$^2$. The coating was dried. The surface free energy of the dried primer was 34 mN/m. The primer did not "wet" using a 5 wt % aqueous solution of Elvanol 71-30 polyvinyl alcohol and 35 wt % ethanol. This example does not fall within the scope of the present invention.

EXAMPLE 10

A number of aqueous primers, outside the scope of the present invention were coated onto 25 μm unoriented nylon 66 film using a gravure roll. The primers were dried and then coated with a 5 wt % aqueous solution of Elvanol 71-30 polyvinyl alcohol containing 25 wt % isopropyl alcohol. The PVAL coating, after drying had a weight of about 0.81 g/m$^2$. The PVAL coating films were adhesively laminated to 51 μm thick low density polyethylene films. The bond strengths and oxygen transmissions were determined. The results are shown in Table 1.

TABLE 1

| PRIMER | COATING wt (g/m$^2$) | OPTICS | 0 TRANSM.+ | BOND g/cm 0% RH | 80% RH |
|---|---|---|---|---|---|
| SPENBOND*650 2 part epoxy | 3.74 | poor | 0.001 64 | >275 | 67 |
| AD77T670* 1 part acrylic | 5.37 | poor | 0.001 27 | >275 | 84 |
| AD77T660* 2 part acrylic | 5.37 | poor | 0.000 20 | 240 | 43 |
| SERFENE*2060 PVdC emulsion | 5.37 | poor | 0.000 02 | 30 | — |

+ ml/cm$^2$/24 h
* trademark

The above experiments show that aqueous primers seem to either have good oxygen permeabilities or good bond strengths, but not both.

I claim:

1. A composite structure comprising a base synthetic thermoplastic polymeric layer having two coatings on one side of the base layer, the first coating being adjacent the base layer and being a solvent-based urethane primer, which when dry allows an aqueous dispersion or solution of polyvinyl alcohol to "wet out" the primer, in an amount in the range of from 0.3 to 3.0 g/m$^2$ of the base layer, and the second coating being placed on the exposed surface of the first coating and comprising a polyvinyl alcohol gas barrier material in an amount in the range up to about 2.0 g/m$^2$ of said base layer, said second coating having been formed from a dispersion or solution.

2. The composite structure of claim 1 wherein the primer is a two-component urethane primer.

3. The composite structure of claim 1 wherein the polyvinyl alcohol is present in an amount of from 0.15 to 1.0 g/m$^2$.

4. The composite structure of claim 1 wherein the polyvinyl alcohol has a saponification value of at least 9 mole percent.

5. The composite structure of claim 4 wherein the polyvinyl alcohol has a saponification value of at least 99 mole percent.

6. The composite structure of claim 1 wherein a heat-sealable layer is adhered to the second coating.

7. The composite structure of claim 6 wherein the heat-sealable layer is adhesively coated to the second coating.

8. The composite structure of claim 6 wherein the heat-sealable layer is extrusion coated to the second coating.

9. A composite structure comprising a base synthetic thermoplastic polymer layer selected from nylon, polyethylene, polypropylene, polyester, ionomer and ethylene/vinyl acetate copolymer, said layer having two coatings on one side thereof, the first coating being adjacent to the base layer and being a solvent-based primer, which when dry allows an aqueous dispersion or solution of polyvinyl alcohol to wet out the primer, in an amount of from 0.5 to 3.0 g/m² of the base layer, and the second coating being placed on the exposed dried surface of the first coating and comprising a polyvinyl alcohol gas barrier material in an amount in the range of from 0.15 to 1.0 g/m² of said base layer, said second coating having been formed from a dispersion or solution.

10. A composite structure of claim 9 wherein the primer is a two-component primer.

11. A composite structure of claim 10 wherein the polyvinyl alcohol has a saponification value of at least 9 mole percent.

* * * * *